United States Patent
Olivo, Jr. et al.

(10) Patent No.: US 7,769,207 B2
(45) Date of Patent: Aug. 3, 2010

(54) SYSTEM AND METHOD FOR COLLECTION, STORAGE, AND ANALYSIS OF BIOMETRIC DATA

(76) Inventors: John W. Olivo, Jr., 26 Lenox Rd., Summit, NJ (US) 07901; Spencer A. Rathus, 160 Riverside Blvd., Suite 27A, New York, NY (US) 10069

( * ) Notice: Subject to any disclaimer, the term of this patent is extended or adjusted under 35 U.S.C. 154(b) by 973 days.

(21) Appl. No.: 11/097,775

(22) Filed: Apr. 1, 2005

(65) Prior Publication Data
US 2006/0222211 A1 Oct. 5, 2006

(51) Int. Cl.
*G06K 9/00* (2006.01)
(52) U.S. Cl. .................. 382/115; 382/103; 351/204; 348/135
(58) Field of Classification Search ............... 382/115, 382/100, 103, 117, 118, 181, 190, 195; 351/204; 348/135
See application file for complete search history.

(56) References Cited

U.S. PATENT DOCUMENTS

| | | | |
|---|---|---|---|
| 6,070,159 | A | 5/2000 | Wilson et al. |
| 6,219,439 | B1 | 4/2001 | Burger |
| 6,498,970 | B2 | 12/2002 | Colmenarez et al. |
| 6,522,772 | B1 | 2/2003 | Morrison et al. |
| 6,690,673 | B1 | 2/2004 | Jarvis |
| 6,698,653 | B1 | 3/2004 | Diamond et al. |
| 6,745,520 | B2 | 6/2004 | Puskaric et al. |
| 6,783,459 | B2 | 8/2004 | Cumbers |
| 6,799,163 | B2 | 9/2004 | Nolan |
| 6,802,005 | B1 | 10/2004 | Berson |
| 6,898,299 | B1 * | 5/2005 | Brooks .................. 382/115 |
| 2003/0048929 | A1 * | 3/2003 | Golden et al. .......... 382/115 |
| 2004/0116842 | A1 | 6/2004 | Mardirossian |
| 2004/0117638 | A1 | 6/2004 | Monroe |
| 2004/0131160 | A1 | 7/2004 | Mardirossian |
| 2004/0143454 | A1 * | 7/2004 | Kimmel .................. 705/2 |
| 2004/0172403 | A1 | 9/2004 | Steele et al. |
| 2004/0208343 | A1 | 10/2004 | Golden et al. |
| 2004/0243567 | A1 | 12/2004 | Levy |
| 2004/0254868 | A1 | 12/2004 | Kirkland et al. |

OTHER PUBLICATIONS

Jain, et al, An Introduction to Biometric Recognition, Jan. 2004, IEEE Transactions on Circuits and Systems for Video Technology, Special Issue on Image- and Video-Based Biometrics, vol. 14, No. 1.*

Constance L. Hays, What Wal-Mart Knows About Customers' Habits, New York Times, Nov. 14, 2004, http://209.157.64.200/focus/f-news/1279640/posts.

(Continued)

*Primary Examiner*—Anand Bhatnagar
(74) *Attorney, Agent, or Firm*—Ward & Olivo

(57) ABSTRACT

The disclosed system and method utilizes a plurality of biometric sensing and recording apparati as a means of observing, tracking, and identifying people. In particular, biometric data is collected, stored, sorted, and/or analyzed, creating a composite profile of one or more individuals regardless of whether or not their identity is known. The system permits more effective location and identification of individuals in secure settings or in the environment at large, as well as the location of individuals who may be lost or in need of aid. It also permits the prediction of the future behavior of these individuals, so that they may be tracked or intercepted.

23 Claims, 13 Drawing Sheets

OTHER PUBLICATIONS

Liu, et al., Criminal Incident Prediction Using a Point-Pattern-Based Density Model, International Journal of Forecasting 19 (2003) 603-622 http://www-marketing.wharton.upenn.edu/forecast/Conflicts/PDF%20files/Liu_and_Brown,_Criminal.pdf.

Jain, et al, An Introduction to Biometric Recognition, Appeared in IEEE Transactions on Circuits and Systems for Video Technology, Special Issue on Image- and Video-Based Biometrics, vol. 14, No. 1 Jan. 2004, http://biometrics.cse.msu.edu/JainRossPrabhakarCSVT_v15.pdf.

* cited by examiner

SYSTEM AND METHOD FOR COLLECTION, STORAGE, AND ANALYSIS OF BIOMETRIC DATA

FIELD OF THE INVENTION

The disclosed system utilizes a plurality of biometric sensing and recording apparati as a means of observing, tracking, and identifying people. In particular, biometric data is collected, stored, sorted, and/or analyzed, creating a composite profile of one or more individuals regardless of whether or not their identity is known. The system permits more effective location and identification of individuals in secure settings or in the environment at large, as well as the location of individuals who may be lost or in need of aid. It also permits the prediction of the future behavior of these individuals, so that they may be tracked or intercepted.

BACKGROUND OF THE INVENTION

Societies that value the rights of the individual recognize that people are generally entitled to privacy. However, under certain circumstances, societies may have a compelling need to know about the locations and activities of individuals. In particular it would be advantageous to observe, track and/or identify individuals entering a private or secure location. It would also be advantageous to observe, track and/or identify individual planning to carry out a crime or an act of terrorism. It would also be advantageous to observe, track and/or identify lost, injured, or confused child or adult who does not have the means or competency to contact parents, guardians, other family members, or helping professionals. Lack of competency may reflect lack of maturity or cognitive impairment due to problems such as intellectual deficiency, brain injury, senile dementia, or Alzheimer's disease. In these cases, society has a legitimate interest in tracking and, perhaps, intercepting people.

Private and government agencies attempt to secure property, information, and people in order to prevent illegal acts against persons or property and, after such acts have been committed, to locate, identify, and apprehend perpetrators. The need for such security has grown dramatically in the twenty-first century. Increased numbers of private and public security personnel guard facilities and attempt to control access to an ever growing group of restricted areas. However, security personnel cannot be everywhere. Therefore, there is a pressing need for automatic systems that will operate in various locations around the clock, and when necessary alert security personnel.

Methods such as security cameras and automatic locking systems enable security personnel to monitor and limit access to many environments from a single location. However, such systems are typically limited to enclosed facilities that tend to keep private records.

Public and private organizations gather and store records for purposes of retrieving information at a later date. For example, telephone service providers keep records of telephone calls, including the telephone numbers of callers and recipients, the time the call was made, the duration of the call, charges associated with the call, and the like. Such data is captured, managed, stored, preserved, and retrievable upon request. Although the main purpose of keeping such records is usually billing, government and private agencies can also use such records in investigatory work. However, the utility of these records is limited because they contain a select and limited amount of information.

More extensive records and analysis are sometimes generated by retail corporations, such as Wal-Mart, which gather data about customers at check-out and online. Such data includes Social Security numbers, drivers' license numbers, credit card information, and a history of products purchased. This data is used mainly for marketing and inventory purposes, to target consumers who may be interested in particular products and to stock stores according to expected demand. Data concerning consumer purchasing is mapped across computer models to forecast future consumer behavior. This methodology has found, for example, that product consumption varies depending on geographic regions, cultural background, and time of year.

The first stage in the use of prediction models is the collection of appropriate data. From this data, patterns are deduced. Prediction models derive anticipated behaviors with degrees of confidence that are based on the regularity or variability of the targeted behavior. For example, retail stores stock certain merchandise for particular events based on forecasts obtained from the analysis of consumer behavior. In another context, cellular networks use prediction models to locate a mobile host (MH) the method facilitates the efficient allocation of bandwidth.

Prediction models are also used informally and formally by law enforcement agencies to forecast criminal behavior. Forecasting enables the agencies to efficiently allocate personnel. When processing means are employed, information technology personnel acquire and enter data concerning the nature and frequency of crimes committed in various neighborhoods. Analysis of this data enables them to forecast future events in these neighborhoods. More officers, or officers with special skills, can then be assigned to high-crime areas.

Government agencies are also developing systems for tracking and identifying individuals as well as events. Identification capabilities have increased with the introduction of biometric technologies. Every person possesses distinct and, typically, invariant biometric characteristics. Current biometric methods include DNA pattern recognition, body geometry feature recognition (ear, hand, finger, etc.), skin recognition (fingerprints, palmprints, etc.), facial recognition, optical recognition (retinal scan, iris scan, etc.), voice recognition, signature recognition, keystroke recognition, vascular pattern recognition, infrared identification (face, hand, hand vein, etc.), odor recognition, and the like.

Biometric systems commonly comprise verification and identification modes. Biometric verification systems are used in industry, Internet security, airport security, and the like. So-called "smart cards" can be fitted with memory chips that contain physiological data about the individual card holder. Then, in order to confirm the identity of the card holder, separate biometric device captures a sample of the individuals physiological data, for example, by scanning a fingerprint or the person's iris, and then compares the newly scanned data with data stored in the smart card. If the data from both sources matches, it is inferred that the individual bearing the card is the same as the individual whose data was stored in the card. Government agencies may implement such verification systems in mass transit environments, such as railways, seaports, and airports. Workers and visitors might be given a universal security card loaded with biometric data for authentication, in contrast to the plurality of individual cards we find in most present systems. However, though biometric verification systems may show that the person bearing the card is the same as the one whose data is stored in the card, they do not necessarily connect with any remote database to obtain the identity of the person or information as to whether or not the person is on, say, a watch list. The present invention, by contrast, advantageously endeavors to match newly captured biometric data with data stored in remote databases to determine the identity of the individual and make a background check.

Biometric personal identification systems rely on databases populated with biometric samples and the corresponding current identification of individuals. When a new biometric sample is captured, it is compared against one or more databases to identify the individual. Such identification systems use a biometric identifier or sensing device to capture data from an individual prior to permitting access to, for example, a venue, a facility, or a computer network. If the currently captured data corresponds with stored data, a signal can indicate whether or not the individual should be granted access to the location. Other uses of such systems include keeping records of individuals present in work environments, school environments, hotels, sporting events, or school buses. Security personnel at Super Bowls and holiday events have used facial recognition techniques to scan the crowd and compare currently-captured faces with faces stored in databases of criminals and missing children. However, biometric identification systems currently in use do not necessarily augment the pre-populated databases. Data which finds no match in the databases may well be discarded. Therefore, no running record is made of the appearances and activities of all scanned individuals. It would be advantageous, as in the present invention, to have the capacity to monitor the activity of any individual sensed by the system and create a record based on newly captured data.

Overall, the utility of current biometric verification and identification systems is limited in that these systems missing part of the "puzzle" that would make them exponentially more useful. What is needed is a system that can collect a plurality of biometric data on people in a plurality of locations, store and catalogue the data, and retrieve it at any time for purposes of analysis and prediction regardless of whether it matches data in a pre-populated database.

SUMMARY OF THE INVENTION

One object of the invention is to provide a network of devices for capturing biometric data.

Another object of the invention is to use a plurality of means of capturing biometric data to identify persons in an environment.

Another object of the invention is the integration of a plurality of methods for capturing biometric data into an environment to track human activity.

Another object of the invention is to build a database which stores biometric data pertaining to every individual who comes into contact with the system. This database might comprise a network of existing and/or newly devised databases.

Another object of the invention is the coordination of various modalities or methods of capturing biometric data to construct a composite description of persons in a given environment. The means for constructing such a composite description may comprise the capturing of biometric data in at least two different modalities at the same time in the same location, or at closely related times in closely related locations.

Another object of the invention is to use a plurality of means of capturing biometric data to track human activity among the population and world at large. The tracking of the population and world at large suggest that the placement and coordination of methods of capturing biometric data, and analysis of the data, might cross international boundaries and geographical features such as oceans and mountains.

Another object of the invention is to use a plurality of means of capturing biometric data to track human activity in a circumscribed facility or geographical region. Such a facility or geographical region could be, but shall not be limited to a residence, a cruise ship, a subway car, a subway stop, a hotel, a commercial facility, a block, a neighborhood, a city, a state, a province, or a country.

Another object of the invention is to use a plurality of means of capturing biometric data to track human activity in a secure environment or facility, such as prisons, power plants, nuclear facilities, munitions factories and storage facilities, chemical research laboratories, biological research laboratories, medical facilities, government facilities, airports, and the like.

Another object of the invention to use a plurality of means of capturing biometric data in an environment to allow users of the system to survey the frequency with which persons with certain biometric features travel to various locations or within various facilities.

Another object of the invention is to use a plurality of means of capturing biometric data to predict the behavior of humans in an environment or facility. The system could predict the next location of the individual from his or her tracking history.

Another object of the invention is the tracking and identification of individuals via the integration of mechanical means—including a plurality of biometric sensors and the processing of data captured by these sensors—with human investigatory activity.

In accordance with one embodiment, the invention comprises: (i) at least one means for capturing biometric data, (ii) at least one database for storing said biometric data, (iii) a means for transmitting said captured biometric data to said at least one database, and (iv) a means for processing said biometric data. In use, the means for capturing biometric data captures biometric samples which are transferred by the transmitting means to, and stored in, the database. The processing means compare, correlate, and link the captured information with stored information. Further, a record is kept of said captured biometric data.

In accordance with another embodiment, the invention comprises a method comprising: (i) providing at least one means for capturing biometric data, (ii) transmitting said captured biometric data to at least one database, (iii) storing said biometric data on said at least one database, and (iv) processing said biometric data. In use, the means for capturing biometric data capture biometric samples which are transferred to, and stored in, the database. The captured information is then compared, correlated, and linked to stored information. Further, a record is kept of said captured biometric data.

In accordance with another embodiment, the invention comprises a method for tracking at least one person, the method comprising: (i) providing at least one means for capturing biometric data, (ii) transmitting said captured biometric data to at least one database, (iii) storing said biometric data on said at least one database, (iv) comparing said captured biometric data against biometric data stored on said at least one database, (v) finding at least one match between said captured biometric data and said stored biometric data on said at least one database, (vi) linking said matching data, and (vii) extracting at least one stored location and at least one stored time of said stored biometric data. In use, the means for capturing biometric data capture biometric samples which are transferred to, and stored in, the database. The captured biometric data is compared, matched, and linked to stored data. Further, a record is kept of the activity of said at least one person based on a composite or all said extracted and said captured locations and times.

In accordance with another embodiment, the invention comprises a method for predicting the activity of at least one person, the method comprising: (i) providing at least one means for capturing biometric data, (ii) transmitting said captured biometric data to a database, (iii) storing said biometric data on said database, (iv) comparing said captured biometric data against biometric data stored on said database, (v) finding at least one match between said captured biometric data and said stored biometric data on said database, (vi) linking said matching data, (vii) extracting at least one stored location and at least one stored time of said stored biometric data, and (viii) computing a projection vector by correlating said all extracted and said captured locations and times. In use, the means for capturing biometric data capture biometric samples which are transferred to, and stored in, the database. The captured biometric data is compared, matched, and linked to stored data. Further, a projection vector is then computed to predict the activity of said at least one person.

BRIEF DESCRIPTION OF THE DRAWINGS

A further understanding of the present invention can be obtained by reference to preferred embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION OF THE INVENTION

Detailed illustrative embodiments of the present invention are disclosed herein. However, techniques, systems and operating structures in accordance with the present invention may be embodied in a wide variety of forms and modes, some of which may be quite different form those in the disclosed embodiments. Consequently, the specific structural and functional details disclosed herein are merely representative, yet in that regard, they are deemed to afford the best embodiments for purposes of disclosure and to provide a basis for the claims herein which define the scope of the present invention. The following presents a detailed description of preferred embodiments of the present invention.

Figure 1A:
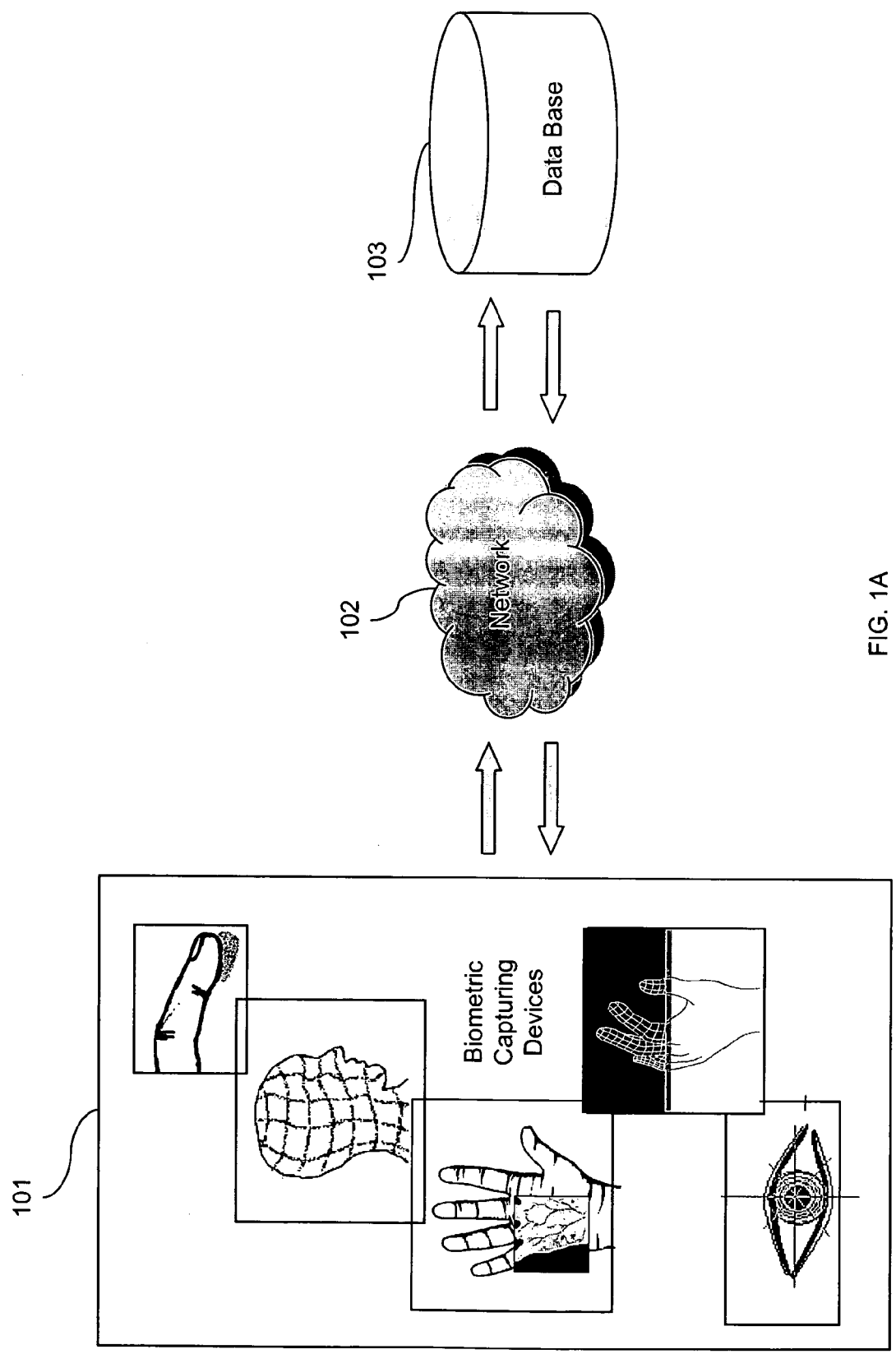
FIG. 1A shows the interaction of biometric capturing devices with a database through a network.

The invention comprises a non-intrusive system which collects biometric data at various locations. The data is collected through a variety of biometric devices 101 which is transferred into database 103 through network 102 to be stored and analyzed, as shown in FIG. 1A. The biometric devices comprise various scanners or sensors capable of collecting one or more types of biometric samples. Such devices could perform DNA pattern recognition, body geometry feature recognition (ear, hand, finger, etc.), skin recognition (fingerprints, palmprints, etc.), facial recognition, optical recognition (retinal scan, iris scan, etc.), voice recognition, signature recognition, keystroke recognition, vascular pattern recognition, infrared identification (face, hand, hand vein, etc.), odor recognition, or the like. It is desired that each biometric device is associated with a known location and can record the time of biometric data capture. Thus, a transferred data-packet can contain at least one biometric sample and the location and time that the sample was captured. It is beneficial to know the location and time of the data-capturing to enhance the abilities to monitor and track individuals as they travel across different locations at different times. The data-packet described above may additionally consist of other parameters such as any information pertaining to the individual associated with the captured biometric sample.

Network 102 used for data transfer could be, for example, wireless or hardwired, GSM, ISDN, Ethernet, CATV, WiFi, any type of LAN, Bluetooth, or the like. The transferred data-packet could be received by a monitoring location where it is stored on database 103 and further analyzed by processing means therein. The processing means of database 103 could perform various desired tasks including, but not limited to correlating, sorting, comparing, linking, and mapping data; performing statistical and probability analyses; or the like. Such analysis allows the system to identify individuals, track individuals, and, further, forecast activity by the individual based on historic activity. Identification analysis could consist of comparing the newly-captured biometric sample with biometric data previously stored in the database. Depending on whether or not a match is found, the system can execute various desired tasks. If a biometric sample were to be identified as belonging to a wanted criminal, the system could notify law enforcement agencies of the criminal's present location. On the other hand, upon learning the criminal's identity, users of the system might choose to track the individual to monitor his or her activity.

Figure 1B:
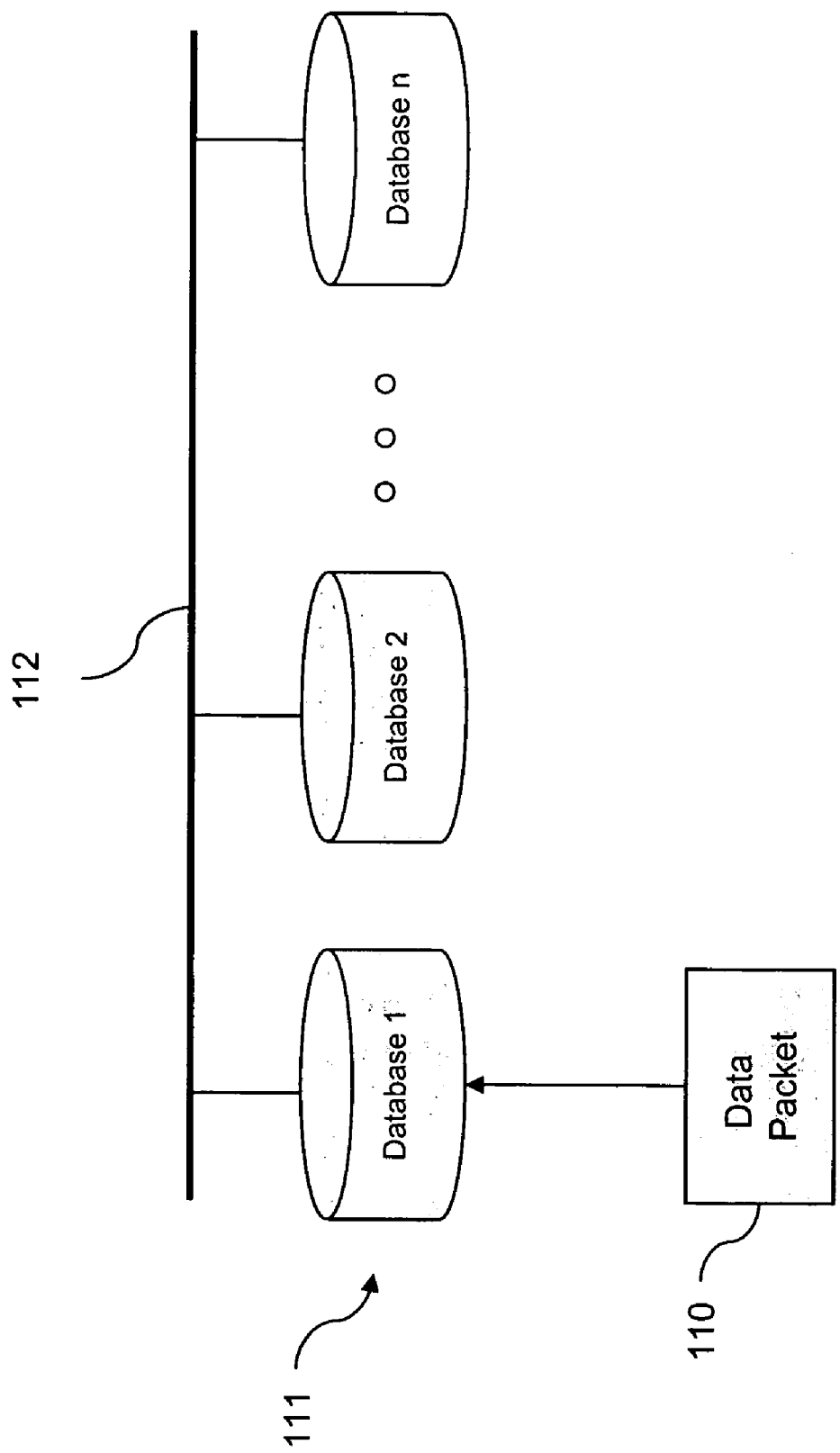
FIG. 1B shows the integration of multiple databases to store biometric data.

In contrast to a single database implementation, the system could comprise multiple databases 111 capable of sharing data through networking 112 as shown in FIG. 1B. An incoming data-packet 110 could be stored in a corresponding or available database (Database 1) and could be shared through networking 112 with multiple other databases (Database 2-*n*). For example, the location containing a biometric capturing device could keep its own local database of records, including biometric samples captured at that location. That database could link data-packet 110 with corresponding information found among the plurality of databases 111 through networking 112. Additionally, a user of the system could access and search any databases in networking 112.

Figure 2:
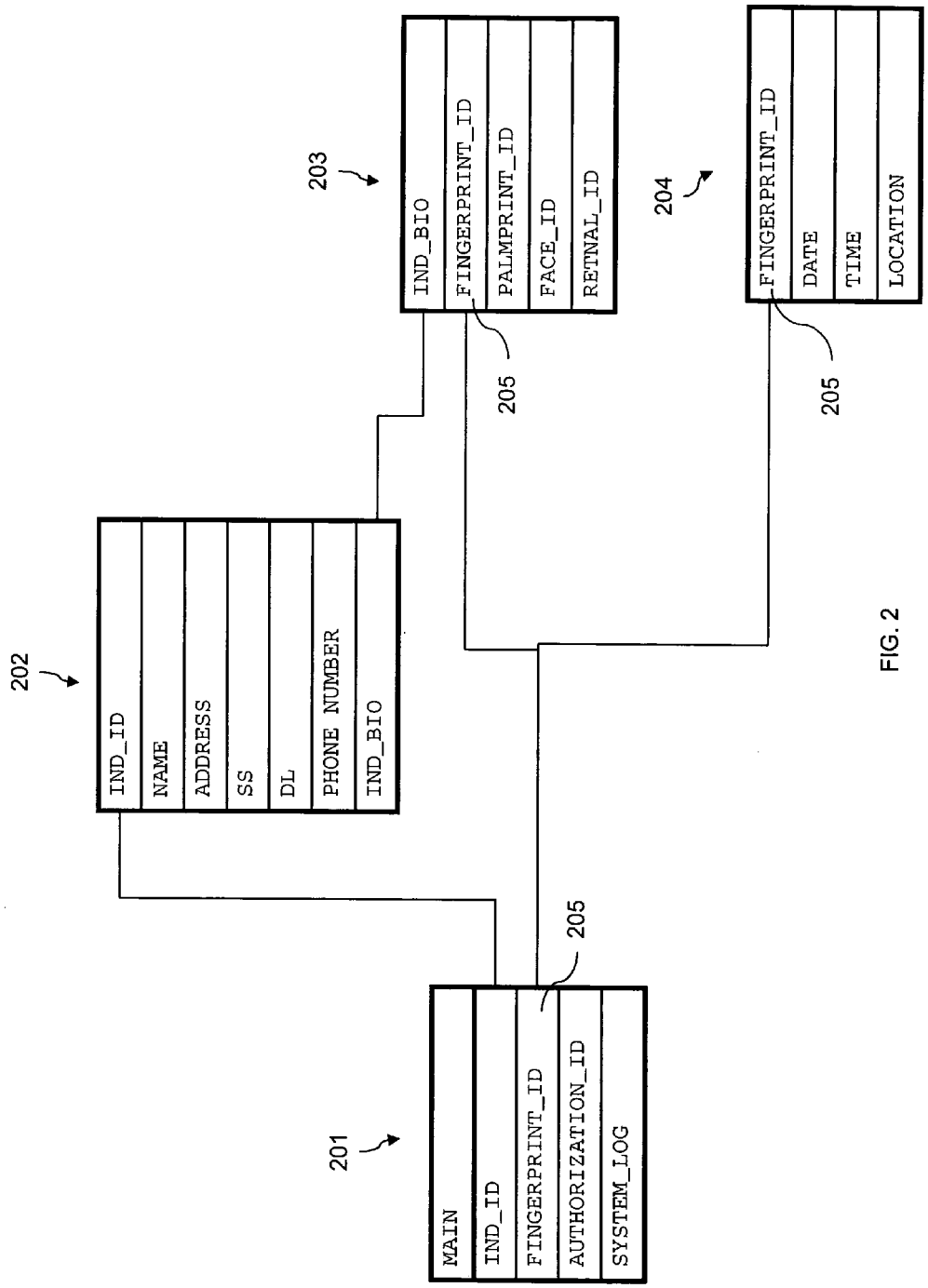
FIG. 2 shows an example of relational data storage technology implemented to store data on the database.

To simplify data retrieval, relational data storage technology could be use to organize data in database 103. Indexed, hierarchical, or any storage technologies known in the art can also be used. Relational data storage technology links stored files and is exemplified in FIG. 2. The processing means in the database sorts the data and links it, depending on the specified criteria. Biometric samples can be sorted according to type of biometric data, the identity of the person to whom it belongs, the date and time they were captured, the location at which they were captured, and the like. For example, a captured fingerprint sample could be identified by means of fingerprint ID 205 and stored with the time and location of the fingerprint capture 204. This file could be further linked to general main file 201, such that by entering a fingerprint ID in the main file, the user can access additional data corresponding with the fingerprint ID. If the processing means analyzes the fingerprint and finds a matching individual, fingerprint ID 205 could be linked to the individual's general biometric file 203, which likely contains a plurality of other biometric data corresponding to the individual. Furthermore, the individual's biometric file could be linked to additional information 202 such as the individual's ID (IND_ID), name, address, social security (SS), driver's license (DL), phone number, and the like. While searching such a database, the user can access the fingerprint sample by imputing various types of information such as a known fingerprint ID or the location at which the fingerprint sample was captured. The processing means will then extract all of the biometric data collected at that location, along with information as to whom the data belongs. This method of data storage technology simplifies data retrieval and processing.

Figure 3:
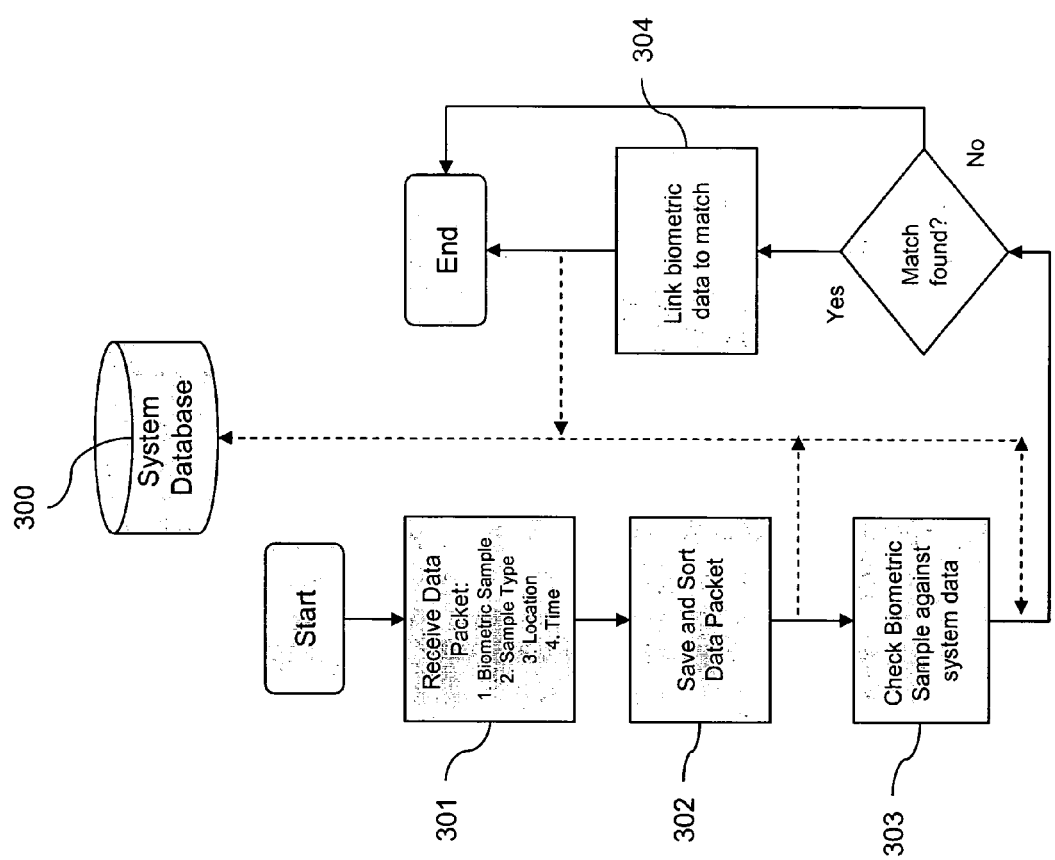
FIG. 3 shows a flow diagram which illustrates a method for storing and processing received data-packets.

FIG. 3 illustrates a method for storing and processing received data-packets. After the biometric device captures a biometric sample and records the time at which it was captured, a data-packet could be transferred to the database containing, but not limited to, the biometric sample, sample type, the location, and the time the sample was captured, as in step 301. The data-packet could then be saved in database 300 and the processing means of database 300 could sort the data in step 302. The processing means could further compare the biometric sample with the same type of data stored in database 300 to identify the individual in step 303. If no match were found, no further action would be taken. However, the biometric sample would remain stored in a general file until further updates were obtained. However, if the processing means found a match, the data-packet could be linked to information associated with that match in step 304.

Figure 4:
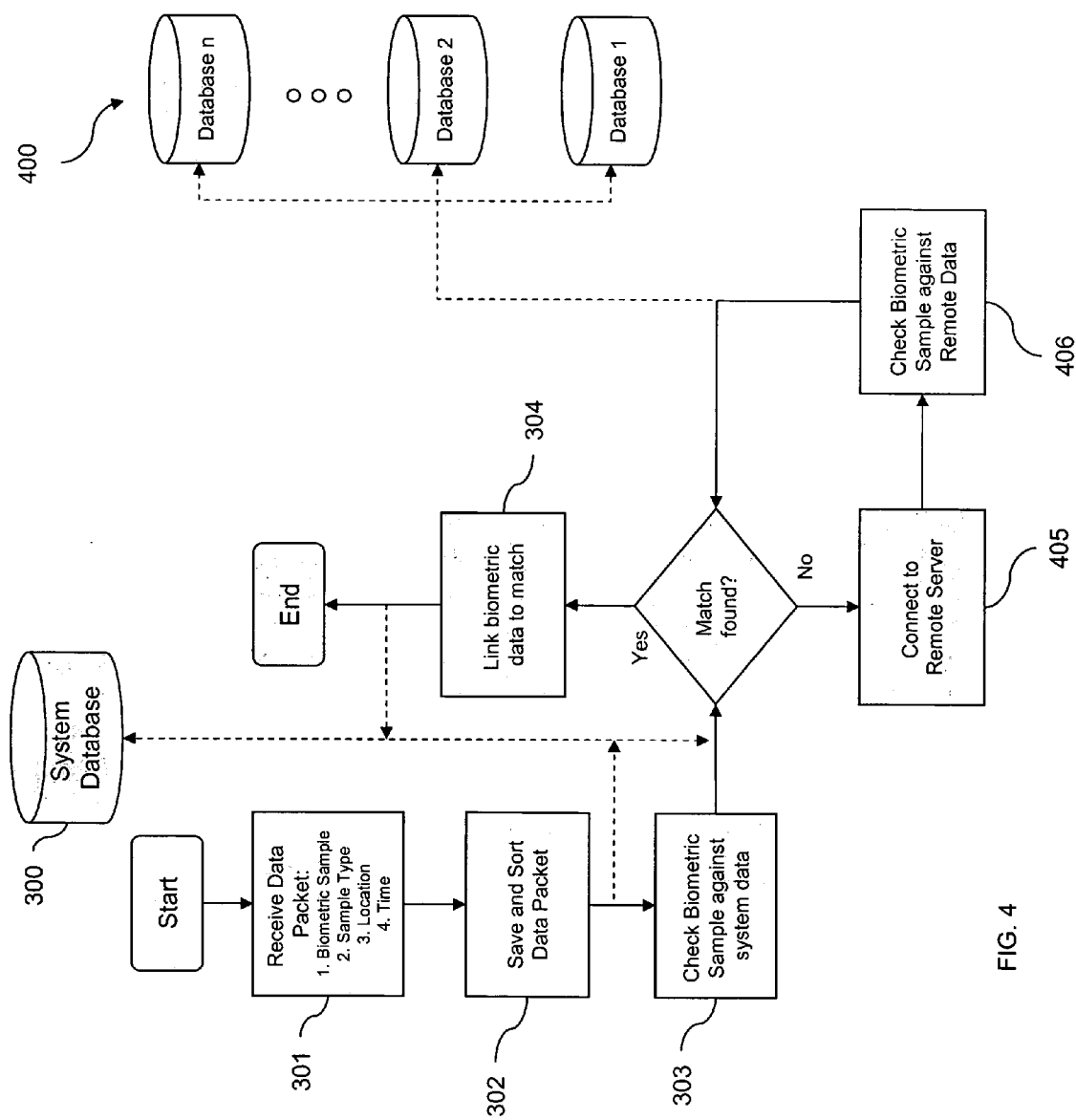
FIG. 4 shows a flow diagram which illustrates a method for integration of remote databases to identify an individual bearing the biometric data.

The system could also search available remote databases in order to identify the individual from whom the biometric data was captured. The system would work as shown in steps 301-303 of FIG. 3; however, if no match for the biometric sample were found in database 300, the processing means could connect to a remote server in step 405 to compare the biometric sample with a larger universe of remotely stored data in step 406, as shown in FIG. 4. A plurality of databases 400 could be searched, as long as each database contained biometric samples of the sort entered and the identities of individuals associated with the samples. The databases could comprise, but need not be limited to, criminal, medical, military, immigration, commercial, or other similar records. In use, the processing means could first compare the biometric sample with the biometric data available on remote Database 1. If a match were found, the processing means could link the data-packet to the match in the remote database 400 in step 304. However, if no match were found, the processing means could connect with a different database (Database 2) to perform the search. The search would continue until last Database n was reached. If no match were found after searching all available remote databases 400, the system could indicate that a match was not made and/or keep the biometric sample as unidentified until further updating of the databases occurred.

Figure 5:
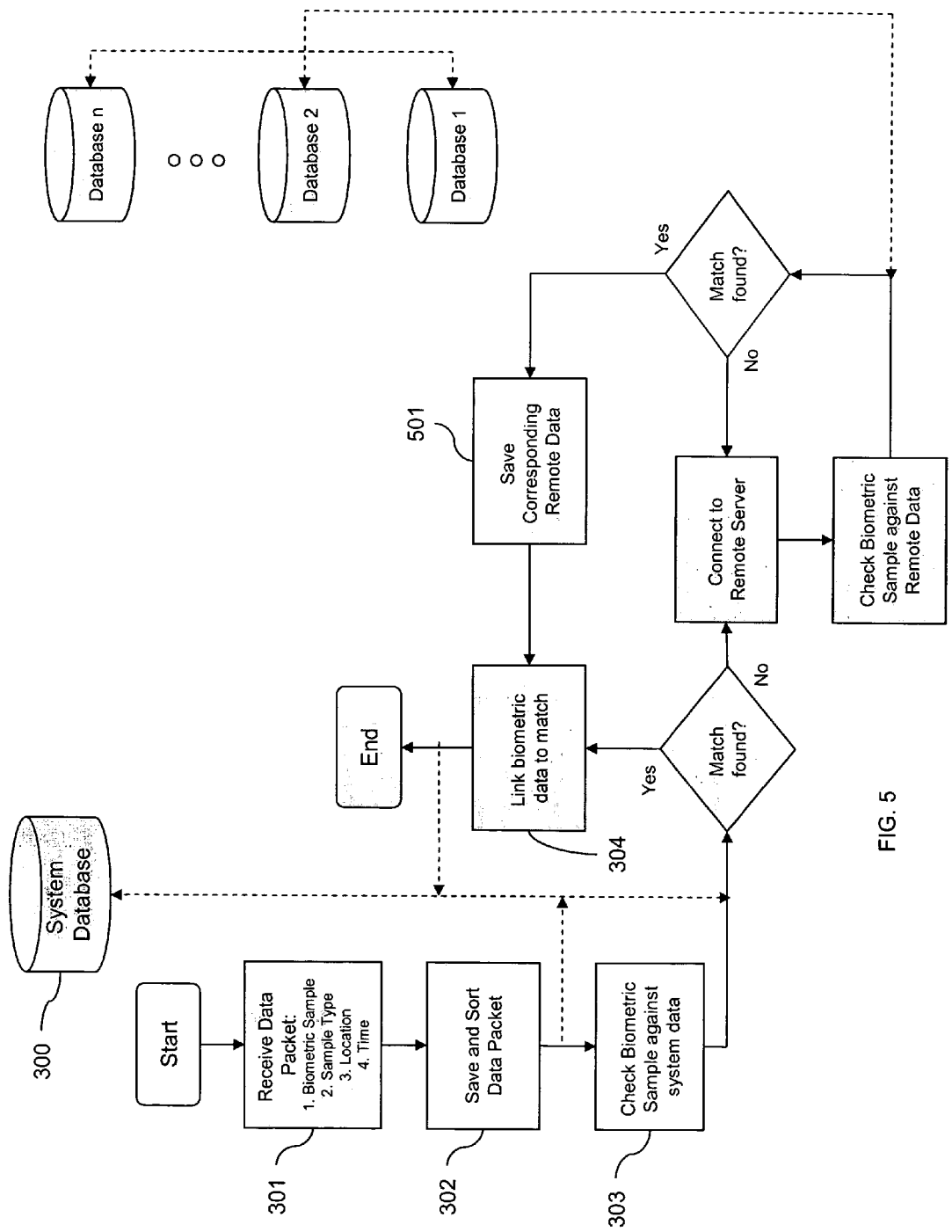
FIG. 5 shows a flow diagram which illustrates a method for data transfer from remote databases wherein the data contains information corresponding to captured biometric sample.

Alternately, instead of linking the data from the remote server with the data-packet, the data from the remote server could be downloaded and saved on the database within the system in step 501, as shown in FIG. 5. The new data would be sorted by the processing means and linked to the corresponding data-packet in step 304. Moreover, instead of downloading a portion of data from the remote database, all of the data could be downloaded to the database within the system.

Figure 6:
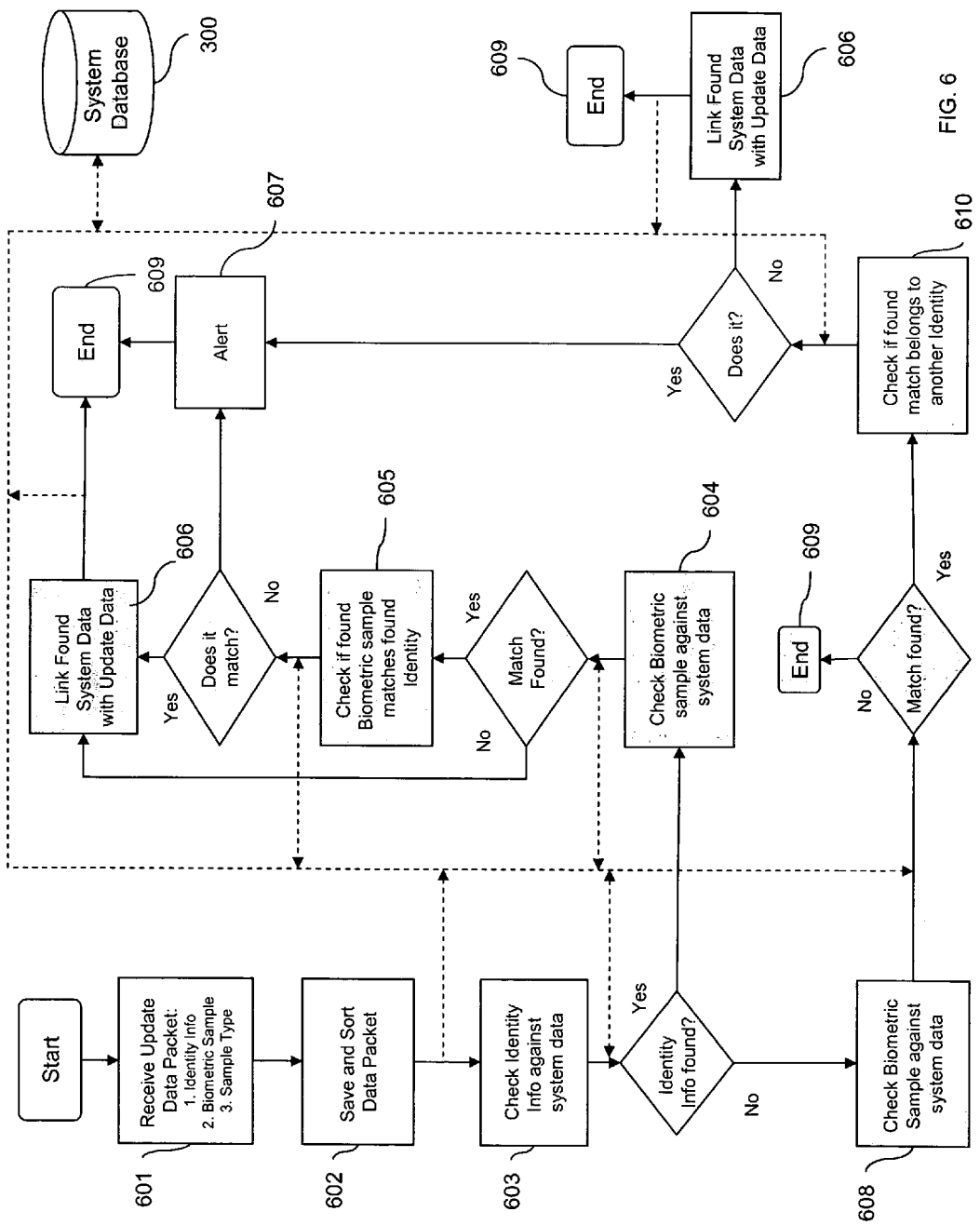
FIG. 6 shows a flow diagram which illustrates a method for updating the database as an update data-packet is received.

FIG. 6 describes a method of updating the database as an "update-data-packet" is received. The update-data-packet could be real time data captured by the system, or data obtained or entered by an outside source. This update-data-packet may contain data such as identity information (e.g. name, SS#, DL, and the like), demographic information, biometric sample pertaining to the individual, or any type of biometric sample shown in step 601. The update-data-packet would be saved on database 300 and sorted by the processing means in step 602. The processing means could then determine whether or not the updated identity data matched any stored identity data in step 603. If such a match were made, the processing means could continue to check whether the updated biometric sample matched any stored biometric data in step 604. If there were such a match, the processing means could determine whether the matched, stored biometric data belonged to the matched, stored identity data in step 605. If so, the updated data is linked to the stored data 606. If the stored identity data were not associated with the same stored biometric data, an alert could be outputted, indicating the inconsistency. Identity theft could thus be readily verified by means of such a system.

Other consequences could occur during such a system update. If an updated identity data were to match stored identity data in step 603, but no stored biometric data were found in the database in step 604, it could be inferred that the individual whose identity data is stored had no record of such biometric data. Thus, the database would link the updated biometric data with other data in the database pertaining to the individual in step 606.

In the case wherein no stored identity data matches corresponding data in the updated data-packet in step 603, the processing means checks whether or not the updated biometric sample matches any stored biometric data in step 608. If no match is found, the updated data can be inferred to be new to the system in its entirety and could therefore remain unlinked to any stored data in step 609 until, and if, further updating finds a link.

Further, in the case wherein no stored identity data matches the updated identity data in step 603, but there is a match between the biometric sample and stored biometric data in step 608, the processing means could check whether the stored biometric data belongs to another identity in step 610. If it does not, then the data is new and the update-data-packet could be linked to the stored biometric data in step 606. However, if the stored biometric data belongs to another identity in step 610, then there exist two individuals who appear to be associated with the same, unique set of biometric data. Since biometric data is unique, this "match" would indicate an inconsistency. Consequently, an alert could be triggered in step 607. Such alerts could be, but should not be limited to, an auditory alarm, a visual alarm such as a caution light or blinking light, an email or text message sent to security personnel, or the like.

Data updates could occur for various reasons. For example, if the system were to download information from a remote database, an update would be necessary to allocate the information to the proper files.

Law enforcement personnel can benefit from the ability to use a biometric database, as described, for purposes of investigation. If they have an individual's identity and a corresponding biometric sample, it could be entered into the system, the system could use it to update its database as well as to retrieve any information associated with the entered individual in question. The law enforcement personnel would therefore possess a complete record of where and when the individual had been.

Figure 7:
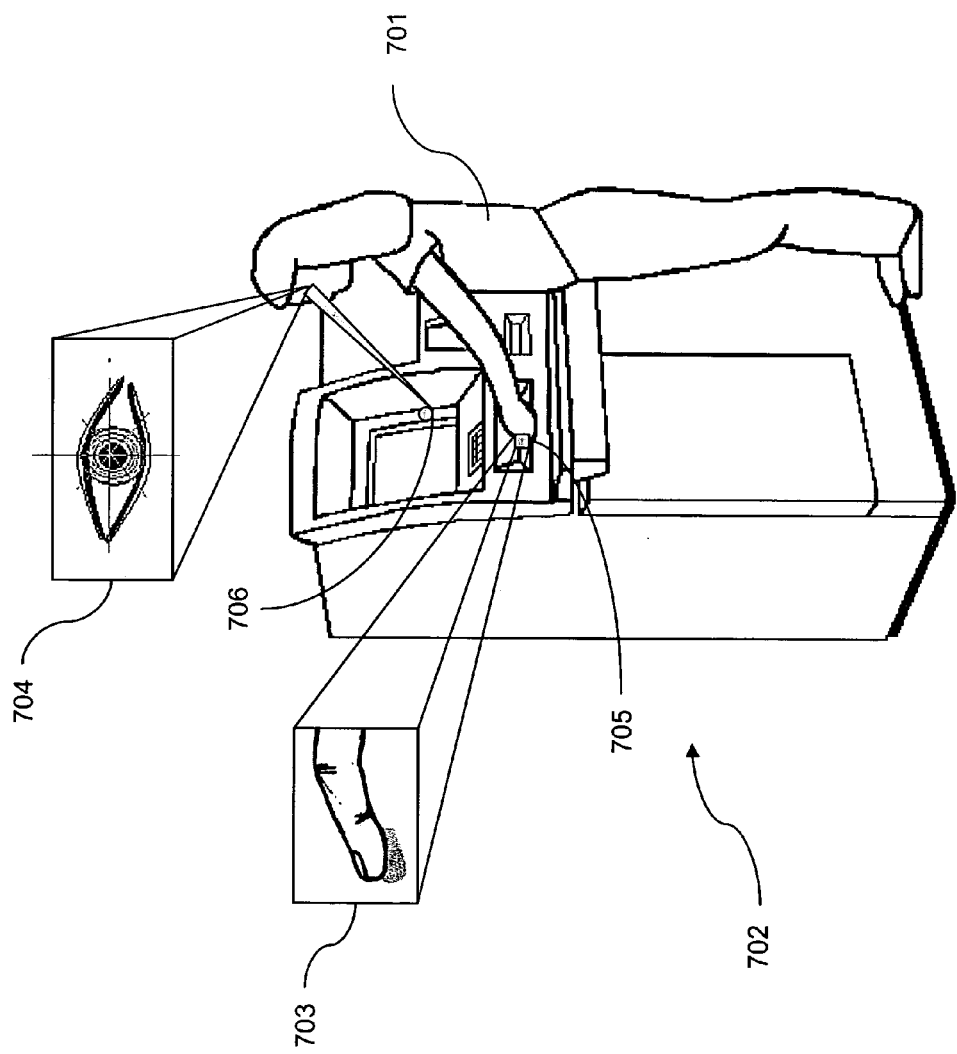
FIG. 7 shows the integration of two biometric capturing means to capture different types of biometric data in a single location.

The biometric capturing system could be implemented in a variety of ways. A single location could acquire one or more samples of biometric data from each individual in the monitored vicinity. FIG. 7 illustrates person 701 using ATM machine 702 while two sensors are used to capture biometric samples. Eye-scanning sensor 706 could be placed anywhere on ATM machine 702 as long as a clear line of sight were available. Fingerprint scanner 705 is placed in a location that will be touched. If a touch screen is used, the entire screen could be engineered to scan fingerprints. Thus, every person using the ATM machine could be scanned in at least one way. Furthermore, the scanners could be visible or hidden, depending on whether it is desirous for the individual being scanned to know that the scanning is taking place.

As person 701 is using ATM machine 702, scanners 706 and 705 will capture biometric samples 704 and 703. The time of the capture could be recorded. The new information could be sent in a data-packet to a local or remote database. Other available information from the ATM, such as the ATM user's identity based on a personal identification number (PIN), can be included in the data-packet. The system can determine that identity theft or fraud is likely to have occurred if there are inconsistencies between stored biometric information and newly-captured and transmitted biometric information. The system can thus authenticate the identity of person 701 using the ATM 702. In the case of an inconsistency, the system can be programmed to take various actions, such as disabling the ATM 702 or notifying the authorities.

Figure 8:
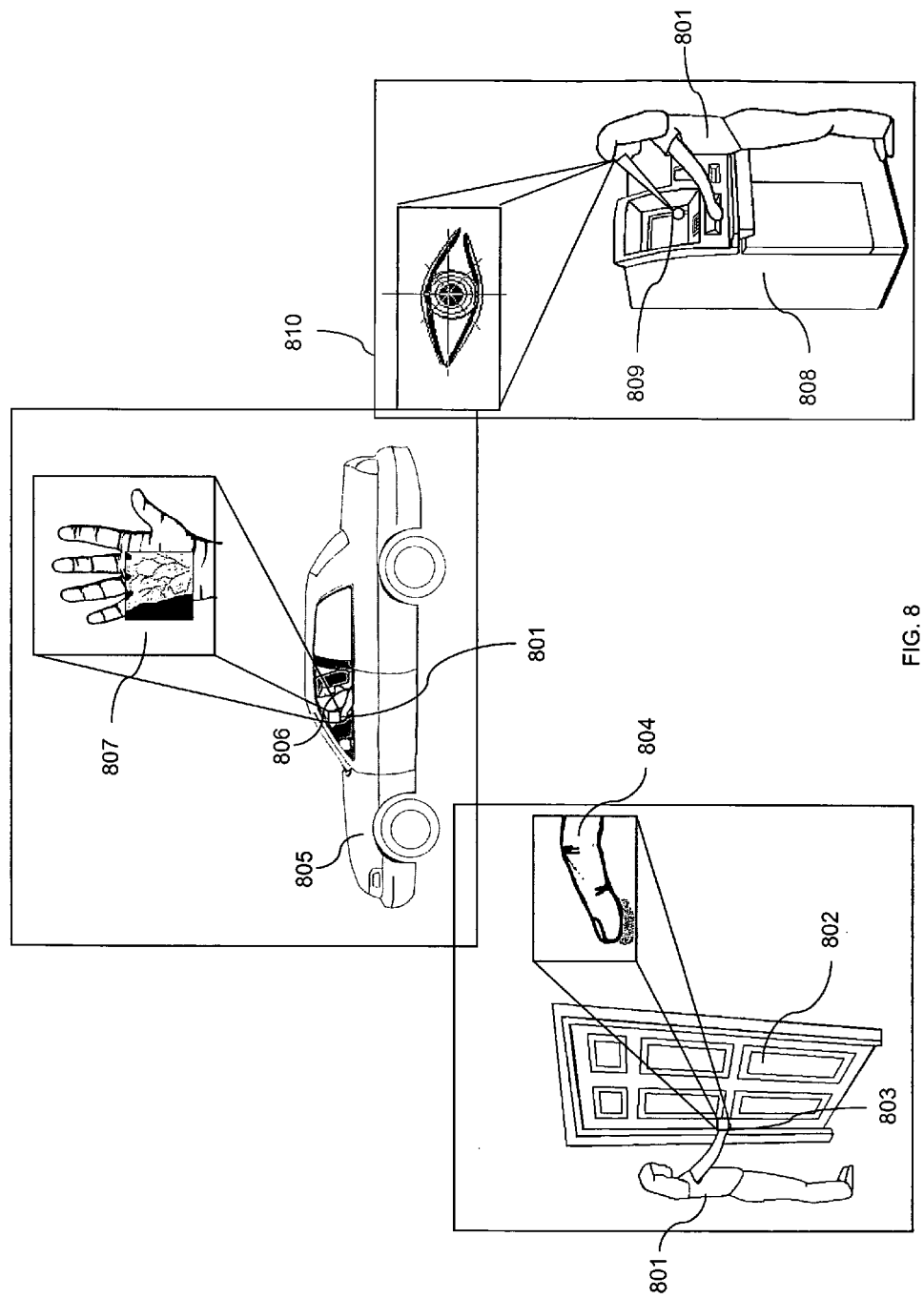
FIG. 8 shows how biometric samples could be collected from a single individual in various locations on a daily basis.

FIG. 8 illustrates how person 801 can be scanned throughout the day. As person 801 leaves his or her place of work, scanner 803 located in a door handle or door knob 802 could be used to acquire fingerprint sample 804. As person 801 drives to the ATM, vehicle 805 can acquire a vascular pattern sample 807 through sensor 806 in a steering wheel. If the automobile is not owned by the driver, the biometric sample can be linked to credit information evidencing whether the person has rented the vehicle. Further, when person 801 arrives at ATM 808, the ATM can obtain an eye scan 810 through built-in scanner 809. All the biometric samples are sent along with the times, locations, and any other captured data in data-packets to a database, where they are stored and, if desired, processed. The biometric capturing devices could be integrated into, but not limited to ATMs, cars, street signs, door handles, airport terminals, handheld devices, computers, or the like.

The ability to scan and, when possible, identify individuals can help track them as they travel from, to, and through various locations. For example, if a child was lost, and his or her biometric data were captured and identified, the system could alert law enforcement personnel, parents, helping professionals, or other users to the present or recent location of the child. Additionally, if the child's biometric data were captured in substantially close proximity to another person, it might be assumed that the child is with that person. It would be helpful to identify kidnappers with such a system, especially if the kidnapper were not aware that his or her biometric data was being captured.

Figure 9:
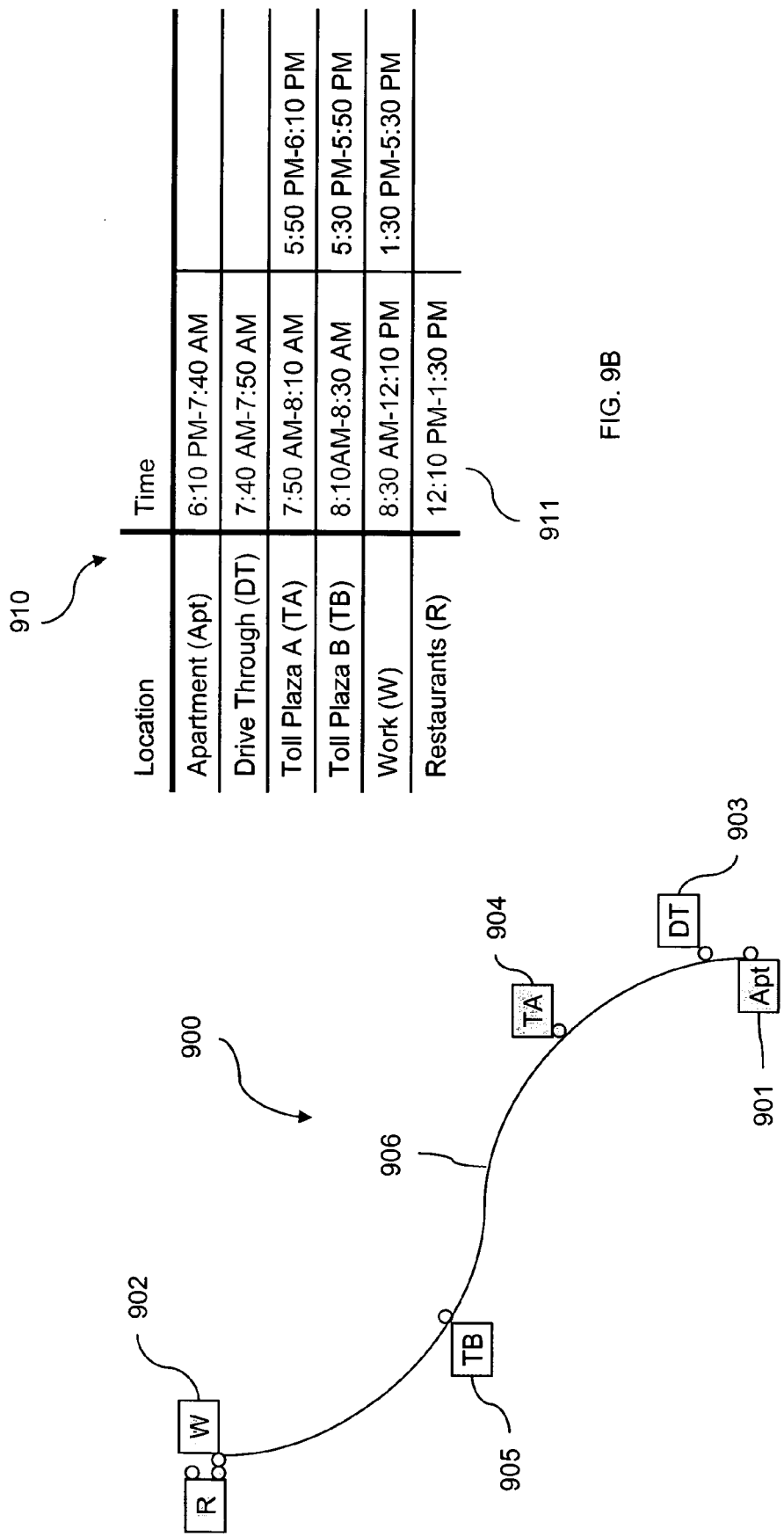
FIG. 9A shows a traveling path prediction corresponding to historical traveling routines.
FIG. 9B shows a location and time table of traveling routines of FIG. 9A.

Additionally, such precise records of activity make it possible to forecasts movement. Given that most people have routines, it becomes possible to predict their future activities with a certain level of confidence. FIGS. 9A-9B show a map of a daily commuting routine. The commuter's biometric data could be captured at different locations throughout the day, including traveling from his or her apartment 901 to work 902. His or her biometric samples are captured in various locations along the way and stored on the database. Historic routine data could be compiled, allowing the processing means to derive time intervals 911 during which the commuter was likely to be at a certain location, as displayed in FIG. 9B. From these intervals, the system could predict that on a typical workday, the individual will leave his or her apartment 901 at approximate time x, stop at drive-through 903 for breakfast at about time y, take the route through toll plazas A and B 904-905, and arrive at work 902 at approximately time z. Each of the locations could record one or more kinds of biometric samples. The toll plazas, for example, could have video cameras capable of capturing images for facial recognition. Alternately, the vehicle could acquire biometric data and transfer it to a toll plaza when the commuter passes by.

The processing means can map out the information on map 900 and derive traveling path 906 by correlating the various locations as shown in FIG. 9A. It could be assumed thereafter that this individual travels Monday through Friday on the traveling path 906. This information could help predict the location of the individual on a future weekday, especially if he or she is sensed somewhere along the derived path. The path could also be broken into intervals between one location to the next, for example, the travel interval from 904 to 905. Knowing the distance between such locations and the time of travel, the speed of travel can be derived. When it is desired to locate the individual, the system will extract the location and time when biometric data was last captured and compare it to derived traveling path 906. For example, if it is desired to find the location of the individual at 8:05 A.M., and it is known that he or she has been scanned at toll plaza A 904 at 8:00 A.M., the system can predict that he or she is traveling along path 906 toward toll plaza B 905. Moreover, the system can predict the location of the individual along the path from the average speed. The system would also recognize when a recurring routine suddenly broke. Such analysis would be crucial if a child were being monitored traveling from home to school. If there was sudden deviation from the routine without notice, security personnel could be notified to investigate the location at which the child's biometric data was last recorded.

Analysis of routines can be applied to a plurality of individuals engaging in the same or similar activity, given that different individuals may follow similar paths to engage in similar behavior. Such a path can be identified by recording the types of activities, their order, and their locations. An analysis of similar crimes can derive a common criminal routine. If such routine is identified as being carried out by an individual, the processing means could alert authorities, who might initiate a watch on that individual.

Figure 10:
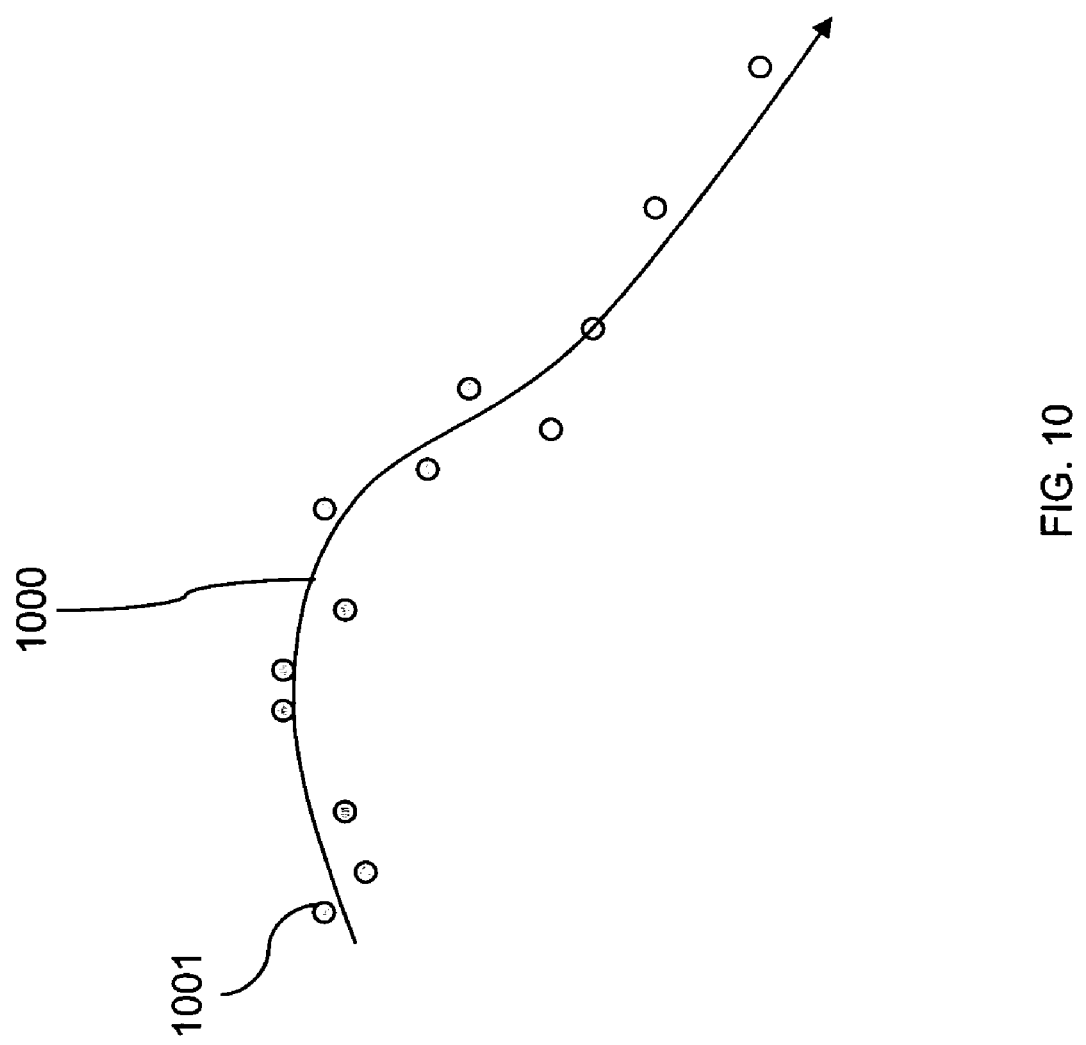
FIG. 10 shows a scatter plot of biometric sample capture and the derived projection vector.

FIG. 10 shows that processing means can also present users of the system with a scatter plot on a display unit to represent the sequence of locations of an individual. The system can gather biometric data at various locations and map them out on a coordinate plot, in which each location is specified by coordinate points 1001. The processing means can then correlate the point coordinates 1001 and derive a projection vector 1000. Knowing the time that the biometric data was captured also allows the system to calculate an average travel speed. The individual could be located following the direction of the projection vector and calculating the distance traveled using the average travel speed.

Other methods of analysis can be applied to the biometric data to predict the location of an individual. Referring again to FIGS. 9A and 9B, one could perform analyses of central tendencies and variability of location point and times to predict future locations at various levels of confidence or confidence intervals. One can observe that the commuter leaves his or her apartment at a mean time of 7:40 A.M. Over time, one can observe that 95% to 96% of departures occur within 7:30 and 7:50, such that a standard deviation for departure time comprises five half minutes. One can define "outliers" as events that occur more than standard deviations from the mean. One can then set the system to alert a user when such an outlier occurs.

Figures 11A, 11B:
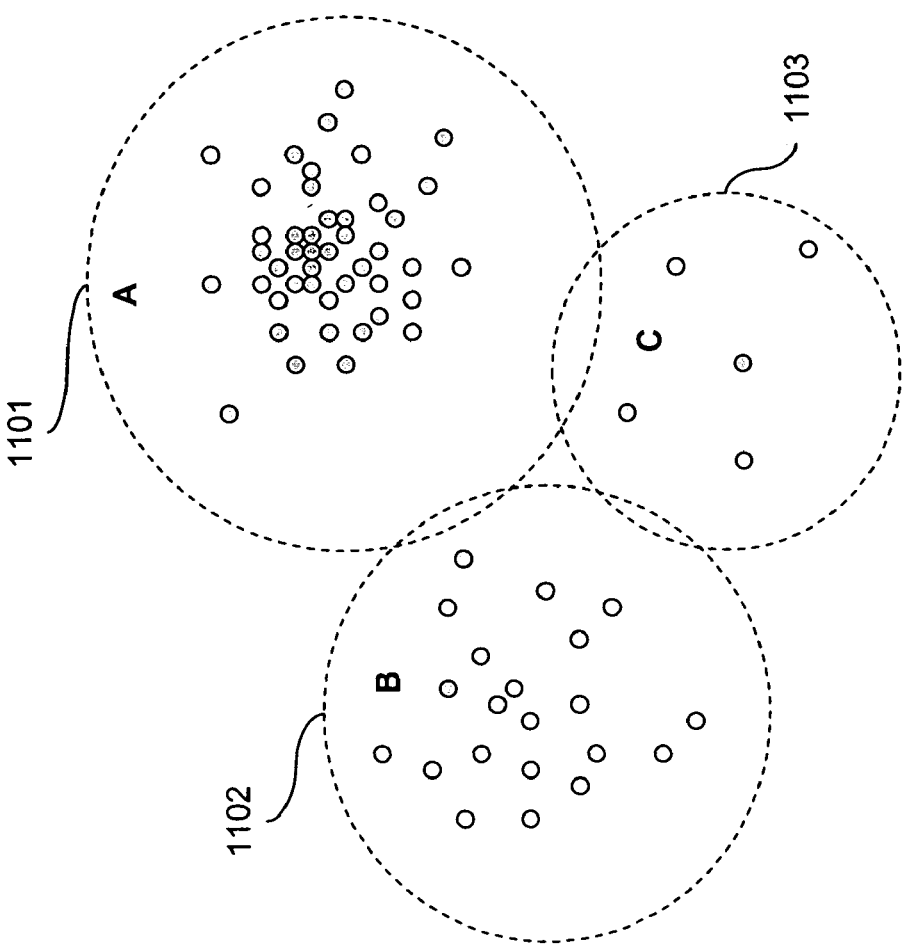
FIG. 11A shows a map displaying different levels of biometric sample capturing concentrations.
FIG. 11B shows a table of calculated duration and proximity of captured biometric samples of FIG. 11A.

An analysis can be performed to identify the concentration of individuals in a single area. FIGS. 11A-11B illustrate different levels of concentration. The system can monitor the concentration by analyzing the distribution of biometric samples. Area A 1101 contains a dense capture of biometric samples. The processing means can determine the concentration of individuals by calculating the timing and the proximity of the captured samples shown 1104. The duration of concentration is based on the number of biometric samples captured in the area within a selected time interval, and the proximity shows the physical closeness of the captured samples. Less dense areas B and C 1102-1103 might show a smaller duration and/or a smaller proximity of samples. Law enforcement agencies can better monitor substantially dense areas 1101-1102 using such a system. Crimes are more likely to occur in certain dense areas due to the locations of clubs, bars, casinos, and the like. Law enforcement personnel could be concentrated accordingly.

Figure 12B:
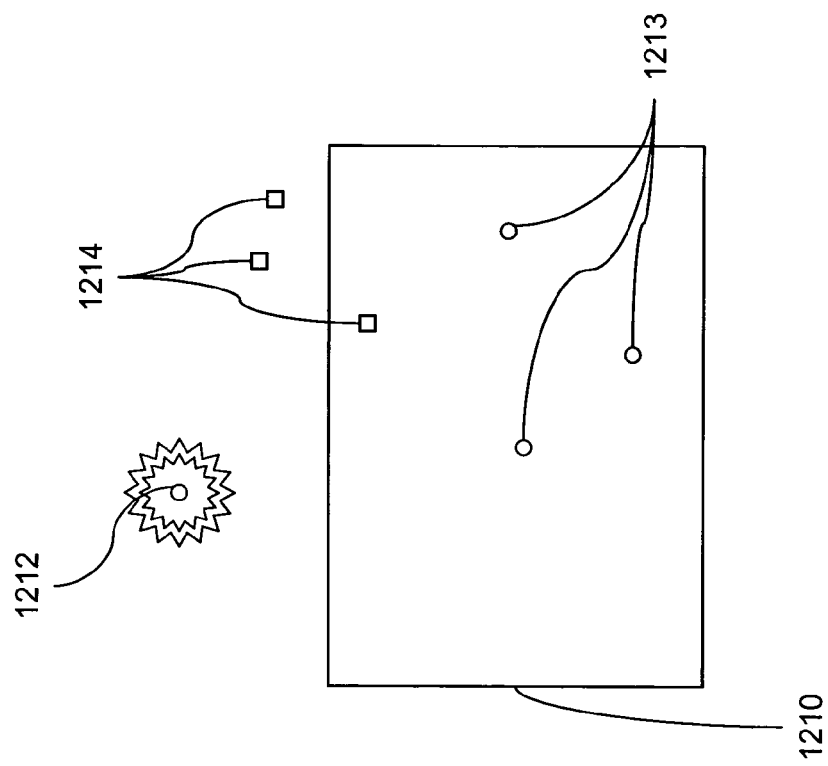
FIG. 12B shows a map of a secure area which desires to keep individuals confined within.
Figure 12A:
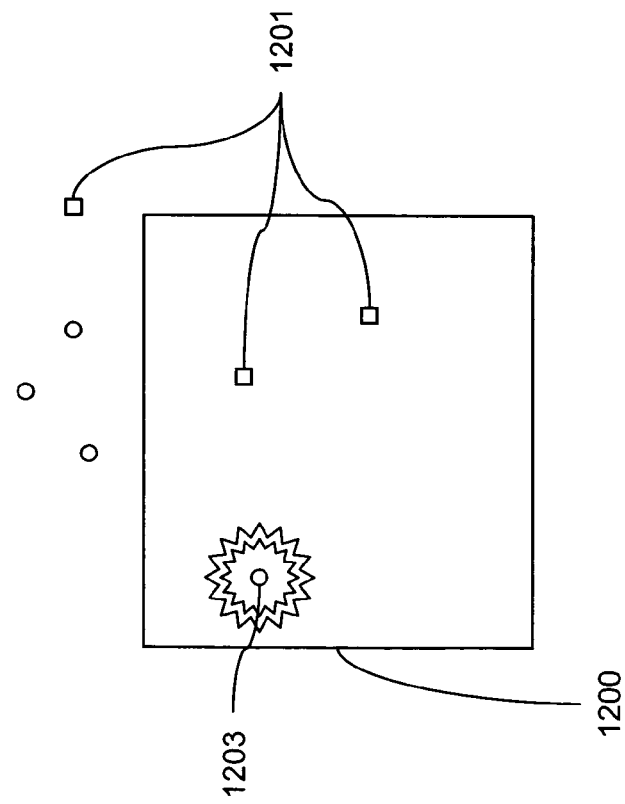
FIG. 12A shows a map of a secure area wherein only authorized personnel have the authority to access.

FIGS. 12A and 12B illustrate tracking an individual's activity relative to a secure or restricted area. In one kind of restriction, only authorized personnel may access the area. In another kind of restriction, individuals are to be kept confined in a restricted area. FIG. 12A illustrates secure area 1200 which is accessible only to authorized personnel 1201. The locations of capturing devices in area 1200 are stored and linked to number of authorized individuals 1201. When individual 1203's biometric sample is captured by capturing devices in area 1200, the system checks whether individual 1203's biometric data corresponds to linked authorized personnel 1201. If no match were found, the system would perform programmed tasks. For instance, if the biometric sensor is integrated into a door or door handle, a non-matching individual 1203 might not be able to open that door. However, if a biometric sample were captured in the restricted area 1200, the system could be set to notify authorities of the apparent intrusion of an unauthorized individual 1203. Authorized personnel 1201 can also be monitored within secure area 1200 as their biometric samples are scanned in by the capturing devices.

Alternatively, FIG. 12B illustrates an area 1210 in which individuals 1213 are confined. The system stores the capturing devices in area 1210 and links them with the individuals 1213 who are not allowed to exit area 1210. Such a system could also make a record of biometric data corresponding to everyone 1214 entering and exiting area 1210. If individual 1212, who is to remain within area 1210 exits the area and is scanned outside, the system could notify the authorities of an apparent escape and, additionally, of the location and time the last biometric sample was taken. This system could be implemented in variety of settings and situations, including hospitals, jails, house arrests, or the like

What is claimed is:

1. A method for tracking a person, comprising:
   storing information regarding a plurality of individuals in a database, wherein the information regarding the plurality of individuals includes, for each individual of the plurality of individuals, biometric data of or regarding the individual of the plurality of individuals, wherein the biometric data is captured or obtained by or with one or more of a plurality of biometric data capturing devices, information regarding a location at which the biometric data of or regarding the individual is captured or obtained, and information regarding a time at which the biometric data of or regarding the individual was captured or obtained;
   receiving and storing biometric data of or regarding the person in the database, wherein the biometric data of or regarding the person is captured or obtained by or with at least one biometric data capturing device;
   receiving and storing information regarding a location where the biometric data of or regarding the person is captured or obtained, wherein the information regarding the location is stored in the database;
   receiving and storing information regarding a time when the biometric data of or regarding the person is captured or obtained, wherein the information regarding the time is stored in the database;
   comparing the biometric data of or regarding the person against at least a portion of biometric data of or regarding at least one individual of the plurality of individuals which is stored in the database;
   identifying at least one match between the biometric data of or regarding the person and at least a portion of biometric data of or regarding an individual of the plurality of individuals;
   linking or matching the biometric data of or regarding the person to or with the biometric data of or regarding the individual;
   generating an activity record regarding the person, wherein the activity record contains information identifying a plurality of locations and times at or in which biometric data was captured or obtained from the person, and further wherein the activity record contains information for tracking a travel path of the person; and
   predicting a future activity record regarding the person, wherein the future activity record contains information regarding a plurality of locations and times at or in which the person will travel in the future.

2. The method of claim 1, further comprising:
   mapping information contained in the activity record; and
   constructing or deriving the travel path.

3. The method of claim 1, further comprising:
   storing the activity record in the database.

4. The method of claim 1, wherein the biometric data of or regarding the person, the location, and the time, is contained in or is transported in a data packet.

5. The method of claim 1, wherein the biometric data of or regarding the person is captured or obtained by two or more biometric data capturing devices.

6. The method of claim 1, wherein the biometric data of or regarding the person is DNA pattern recognition data or information, body geometry feature recognition data or information, skin recognition data or information, facial recognition data or information, photograph data or information, optical recognition data or information, voice recognition data or information, signature recognition data or information, keystroke recognition data or information, vascular pattern recognition data or information, infrared identification data or information, or odor recognition data or information.

7. The method of claim 1, further comprising:
generating a composite description of the person, wherein the composite description contains information regarding instances of location and time at which biometric data has been captured or obtained from the person by at least two biometric data capturing devices.

8. The method of claim 7, further comprising:
checking the composite description against information stored in a plurality of databases; and
identifying the person.

9. The method of claim 1, wherein the database stores biometric data captured or obtained at a plurality of locations.

10. The method of claim 1, wherein the biometric data of or regarding the person is captured or obtained with or by at least two biometric data capturing devices at a single location.

11. The system of claim 1, wherein the system generates a composite description of the person, wherein the composite description contains information regarding instances of location and time at which biometric data has been captured or obtained from the person by at least two biometric data capturing devices.

12. The system of claim 11, wherein the system checks the composite description against information stored in a plurality of databases and identifies the person.

13. A system for tracking a person, comprising:
a database for storing information regarding a plurality of individuals, wherein the information regarding the plurality of individuals includes, for each individual of the plurality of individuals, biometric data of or regarding the individual of the plurality of individuals, wherein the biometric data is captured or obtained by or with one or more of a plurality of biometric data capturing devices, information regarding a location at which the biometric data of or regarding the individual is captured or obtained, and information regarding a time at which the biometric data of or regarding the individual was captured or obtained;
means for receiving biometric data of or regarding the person, wherein the system stores the biometric data of or regarding the person in the database, and further wherein the biometric data of or regarding the person is captured or obtained by or with at least one biometric data capturing device;
means for receiving information regarding a location where the biometric data of or regarding the person is captured or obtained, wherein the system stores the information regarding the location in the database;
means for receiving information regarding a time when the biometric data of or regarding the person is captured or obtained, wherein the system stores the information regarding the time in the database;
means for comparing the biometric data of or regarding the person against at least a portion of biometric data of or regarding at least one individual of the plurality of individuals which is stored in the database;
means for identifying at least one match between the biometric data of or regarding the person and at least a portion of biometric data of or regarding an individual of the plurality of individuals;
means for linking or matching the biometric data of or regarding the person to or with the biometric data of or regarding the individual;
means for generating an activity record regarding the person, wherein the activity record contains information identifying a plurality of locations and times at or in which biometric data was captured or obtained from the person, and
further wherein the activity record contains information for tracking a travel path of the person; and
means for predicting a future activity record regarding the person, wherein the future activity record contains information regarding a plurality of locations and times at or in which the person will travel in the future.

14. The system of claim 13, wherein the system processes information for mapping information contained in the activity record and constructs or derives the travel path.

15. The system of claim 13, wherein the system stores the activity record in the database.

16. The system of claim 13, wherein the biometric data of or regarding the person, the location, and the time, is contained in or is transported in a data packet.

17. The method of claim 13, wherein the biometric data of or regarding the person is captured or obtained with or by two or more biometric data capturing devices.

18. The system of claim 13, wherein the biometric data of or regarding the person is DNA pattern recognition data or information, body geometry feature recognition data or information, skin recognition data or information, facial recognition data or information, photograph data or information, optical recognition data or information, voice recognition data or information, signature recognition data or information, keystroke recognition data or information, vascular pattern recognition data or information, infrared identification data or information, or odor recognition data or information.

19. The system of claim 13, wherein the database stores biometric data captured or obtained at a plurality of locations.

20. The system of claim 13, wherein the biometric data of or regarding the person is captured or obtained by at least two biometric data capturing devices at a single location.

21. The system of claim 13, wherein the database comprises a local database.

22. The system of claim 13, wherein the database comprises a remote database.

23. The system of claim 13, wherein the database comprises a network of databases.

* * * * *